3,700,659
(+)-CIS - 1,3-DIBENZYL-HEXAHYDRO-1H-FURO-
[3,4-d]IMIDAZOLE - 2,4 - DIONE, PROCESSES
AND INTERMEDIATES
Max Gerecke, Reinach, Switzerland, and Jean Pierre Zimmermann, St. Louis, France, assignors to Hoffmann-La Roche Inc., Nutley, N.J.
No Drawing. Filed Nov. 17, 1970, Ser. No. 90,478
Int. Cl. C07c 173/10; C07d 99/04
U.S. Cl. 260—239.5                             11 Claims

ABSTRACT OF THE DISCLOSURE (+)-Cis-1,3-dibenzyl - hexahydro - 1H - furo[3,4-d]-imidazole-2,4-dione, prepared starting with cis-1,3-dibenzyl-hexahydro-1H-furo[3,4-d]-imidazole - 2,4,6- - trione, is described. The end product is a valuable intermediate in the synthesis of (+)-biotin, as well as derivatives and related products thereof.

BRIEF SUMMARY OF THE INVENTION

The invention relates to a new optically active lactone of the formula (structure I)

wherein the rings A and B are cis-linked and R is benzyl.

In another aspect, the invention relates to diastereomeric cis-1,3-dibenzyl - 5 - (3'-cholesteryloxycarbonyl)-2-oxo-4-imidazolidine-carboxylic acids and enantiomeric cis-1,3 - dibenzyl-5-cyclohexyloxycarbonyl - 2 - oxo-4-imidazolidine-carboxylic acids characterized by the formulas:

(structures III and IV)

wherein R is as previously described and $R_1$ is cholesteryl or cyclohexyl, and when $R_1$ is cholesteryl, their triethylamine salts and when $R_1$ is cyclohexyl, their ephedrine salts, as diastereomers.

In a further aspect, the invention relates to a process for preparing the optically active lactone of the formula (structure I)

wherein the rings A and B are cis-linked and R is as previously described, which comprises treating a compound of the formula (structure II)

wherein R is as previously described, with cholesterol or cyclohexanol to yield the corresponding half-esters of the formulas (structures III and IV)

wherein $R_1$ is as previously described, separating the diastereomeric cholesterol half-esters by fractional crystallization of their triethylamine salts and the enantiomeric cyclohexyl half-esters by fractional crystallization of their ephedrine salts, and converting the desired antipode, i.e., the (+) antipode or the desired diastereomer, i.e., the (+)-diastereomer, to the (+)-lactone of Formula I.

DETAILED DESCRIPTION OF THE INVENTION

The invention relates to an optically active lactone of the formula (structure I)

wherein the rings A and B are cis-linked, and R is benzyl.

This optically active lactone is a valuable intermediate in the synthesis of (+)-biotin, as well as of derivatives and related compounds thereof.

For example, the lactone can be converted into the corresponding optically active (+)-thiolactone of the formula (structure)

wherein the rings A and B are cis-linked, and R is benzyl, by reaction with potassium thioacetate at an elevated temperature. The optically active (+)-thiolactone, which is produced, can then be converted to (+)-biotin, for example, analogously to the method described in U.S. patent specification No. 2,489,232 for the racemic thiolactone.

The optically active lactone of Formula I is prepared by a process characterized by the fact that the trione of the formula (structure II)

wherein R is as described above, is converted utilizing cholesterol or cyclohexanol to the corresponding half-esters of the formulas (structures III and IV)

wherein R is as described above and $R_1$ is cholesteryl or cyclohexyl.

The diastereomeric cholesterol half-esters, thus produced, are separated into the respective diastereomers by fractional crystallization of their triethylamine salts and the enantiomeric cyclohexyl half-esters are separated into the respective antipodes by fractional crystallization of their ephedrine salts. The salts of the desired antipode, i.e., the (+)-antipode, or the desired diastereomer, i.e., the (+)-diastereomer, thus obtained, are converted into the (+)-lactone of Formula I. The salts of the other antipode or other diastereomer are optionally hydrolyzed and the diacid formed, after conversion into the trione of Formula II, is recycled into the process.

The (+)-antipode of Formula I is to be understood to be that optical antipode which is dextrorotatory in benzene.

The trione of Formula II, i.e., cis-1,3-dibenzyl-hexahydro-1H-furo[3,4-d]imidazole-2,4,6-trione, used as the starting material is a known substance and can be prepared in accordance with known methods. It can, for example, be obtained by reacting cis-bis-benzylaminosuccinic acid with phosgene in the presence of alkali and thereafter converting the cis-1,3-dibenzyl-2-oxo-4,5-imidazolidine-dicarboxylic acid so obtained into the ring-closed trione of Formula II by treatment with a dehydrating agent.

The conversion of the trione of Formula II utilizing cholesterol or cyclohexanol into the corresponding half-esters of Formulas III and IV is expediently effected in an inert organic solvent, preferably in an aromatic hydrocarbon such as benzene, toluene, xylene and the like. The reaction is also expediently carried out at an elevated temperature, preferably at the reflux temperature of the reaction mixture.

In the case of the cholesteryl half-esters, separation of their diastereomeric half-esters of Formulas III and IV is effected via the diastereomeric salts of said compounds with triethylamine, and in the case of the enantiomeric cyclohexyl half-esters, the resolution is effected with the ephedrine used as the resolving agent. The separation or resolution is expediently effected in an alkanol, such as ethanol, isopropanol and the like, or in a lower ketone such as, acetone, at a temperature in the range of about 40° C. to about the boiling temperature of the reaction mixture. In so doing, in the case of the separation of the cholesteryl half-esters with triethylamine, there firstly precipitates the desired antipode as a dextrorotatory salt. In the case of the resolution of the cyclohexyl half-ester with ephedrine, both (+) and (−)-ephedrine can be used. However, (+)-ephedrine is preferably used, since it precipitates first the salt of the desired antipode, i.e., the (+)-antipode.

These salts can be converted directly into the lactone of Formula I by means of lithium borohydride. The conversion is expediently effected under an atmosphere of an inert gas, for example, under nitrogen, in an inert organic solvent, for example, an ether, such as, dioxane or tetrahydrofuran, or an ether of glycol or diethylene glycol, such as diethylene glycol dimethyl ether, and at a temperature in the range of about room temperature to the reflux temperature of the reaction mixture. The lithium borohydride used in this case can be employed as such or be formed in situ from sodium or potassium borohydride and lithium chloride or lithium bromide.

The salts mentioned above can also be converted prior to the reaction with lithium borohydride into (+)-cis-1,3 - dibenzyl-5-cyclohexyloxycarbonyl-2-oxo-4-imidazolidine-carboxylic acid or into the desired diastereomer (+)-cis-1,3-dibenzyl - 5 - (3'-cholesteryloxycarbonyl)-2-oxo-4-imidazolidine-carboxylic acid in a manner known per se by treating with an acid, and these further processed as described above for the salts.

The half-esters of Formulas III and IV occurring in the course of the process, as well as their salts with triethylamine or ephedrine, are new compounds.

The salts of the undesired antipodes occurring in the separation or resolution can be hydrolyzed in a manner known per se. The resolving agents used are recovered and the cis-1,3-dibenzyl-4,5-imidazolidine-dicarboxylic acid obtained can then be converted into the trione of Formula II and recycled in the process.

The following examples further illustrate the invention. All temperatures are in degrees centigrade, unless otherwise mentioned.

EXAMPLE 1

Preparation of (+)-cis-1,3-dibenzyl-hexahydro-1H-furo[3,4-d]-imidazole-2,3-dione 77.5 g. of cholesterol are suspended in 500 ml. of benzene. To remove the moisture, 135 ml. of benzene are removed by distillation. Then, 45 g. of cis-1,3-dibenzyl-hexahydro-1H-furo[3,4-d]imidazole - 2,4,6 - trione are added. The mixture is boiled at reflux for 18 hours, and thereafter is cooled and concentrated in vacuum. To remove the benzene, the residue is twice dissolved in 50 ml. of acetone and the solvent in each case again removed by distillation. The residue is dissolved in 450 ml. of acetone at 40° C. and treated with 14.9 g. of triethylamine, whereby the temperature rises to 50° C. The mixture is allowed to slowly cool to 23° C. and the crystals which form are removed by filtration (40 g.). After recrystallization from 650 ml. of ethanol, there are obtained 30 g. of pure (+)-cis - 1,3 - dibenzyl-5-(3'-cholesteryloxycarbonyl)-2-oxo - 4 - imidazolidine-carboxylic acid triethylamine salt, $[\alpha]_D^{25}=+8.4°$ (c.=5.0 in chloroform) and having a melting point of 172° C.

The (−)-cis - 1,3 - dibenzyl-5-(3'-cholesteryloxycarbonyl)-2-oxo - 4 - imidazolidine-carboxylic acid released from this salt by shaking with ethyl acetate and dilute hydrochloric acid can be crystallized from acetone/water, and has a melting point of 182° C.; $[\alpha]_D^{20}=-2.8°$ (c.=5 in $CHCl_3$). From the mother liquors of the first crystallization, by cooling to 5° C., there can be obtained the isomeric (−)-cis-1,3-dibenzyl-5-(3'-cholesteryloxycarbonyl)-2-oxo - 4 - imidazolidine-carboxylic acid triethylamine salt which melts at 142° C. after recrystallization from acetone. $[\alpha]_D^{20}=-33.2°$ (c.=5 in $CHCl_3$). The free acid obtained therefrom melts at 150° C. after recrystallization from acetone-water; $[\alpha]_D^{20}=-24.6°$ (c.=5 in $CHCl_3$).

5.9 g. of potassium borohydride and 6.075 g. of lithium chloride are stirred overnight in 73 ml. of tetrahydrofuran under an atmosphere of nitrogen. The mixture is then heated to 30° to 35° C. and a solution containing 30 g. of (+)-cis - 1,3 - dibenzyl-5-(3'-cholesteryloxycarbonyl)-2-oxo-4-imidazolidine-carboxylic acid triethylamine salt in 160 ml. of tetrahydrofuran is added dropwise with stirring over a 2-hour period at a temperature of at most 50° C. The mixture is subsequently boiled at reflux for 2 hours and 65 ml. of tetrahydrofuran are then removed by distillation at normal pressure. 73 ml. of methanol are slowly added to the residue. Then, the mixture is boiled at reflux for ½ hour, 18.25 ml. of concentrated hydrochloric acid are added thereto, the mixture is boiled at reflux for an additional 30 minutes and the solvent is then removed by distillation at normal pressure up to a volume of 75 ml. 250 ml. of methanol are then added, and the mixture is boiled at reflux for 15 minutes and allowed to stand overnight at 15° C. The precipitated cholesterol is filtered, washed with water and ethanol and dried. 13.75 g. of product are recovered. The filtrate is concentrated to 60 ml. under vacuum, mixed with 75 ml. of water and extracted three times with chloroform. The extracts are washed with water, dried and evaporated in vacuum. The residue is taken up in 15 ml. of ether and allowed to stand overnight at 8° C. The crystals are removed by filtration and washed with ether. 11.2 g. of (+)-cis-1,3-dibenzyl-hexahydro-1H-furo[3,4-d]-imidazole - 2,3 - dione are obtained. $[\alpha]_D^{20}=+57.2°$ (c.=1 in benzene).

EXAMPLE 2

Preparation of (+)-cis-1,3-dibenzyl-hexahydro-1H-furo[3,4-d]imidazole-2,4-dione 3.04 g. of sodium borohydride and 6.96 g. of finely powdered lithium bromide are stirred together in 100 ml. of diethylene glycol dimethyl ether. A solution of 8.24 g. of (+)-cis-1,3-dibenzyl-5-(3'-cholesteryloxycarbonyl) - 2-oxo-4-imidazolidine-carboxylic acid triethylamine salt (prepared in accordance with Example 1) in 240 ml. of diethylene glycol dimethyl ether is rapidly added, and the mixture is stirred at 100° C. for 23 hours. The solvent is removed by evaporation in vacuum and the residue is treated with 100 ml. of dioxane and subsequently with 15 ml. of 37 percent aqueous hydrochloric acid. The mixture is subsequently heated to 80° C. and 35 ml. of water are added. After 5 minutes, the mixture is cooled. The precipitated cholesterol is removed by filtration and washed with 30 ml. of 87 percent alcohol. The filtrate is evaporated to dryness in vacuum, the residue is taken up in ethyl acetate, washed with sodium bicarbonate solution and with water. The aqueous extracts are once more extracted with ethyl acetate. After evaporation of the ethyl acetate extracts, the residue is treated with ether, whereby there are obbtained 2.42 g. of (+)-cis-1,3-dibenzyl-hexahydro-1H-furo[3,4-d]imidazole-2,4-dione with a melting point of 118° C. $[\alpha]_D^{25}=+56°$ (c.=1 in benzene). After concentration of the mother liquors, there are obtained an additional 0.2 g. with a melting point of 117° C. $[\alpha]_D^{25}=+51.3°$ (c.=1 in benzene).

EXAMPLE 3

Preparation of (+)-cis-1,3-dibenzyl-hexahydro-1H-furo[3,4-d]imidazole-2,4-dione 336 g. of cis - 1,3 - dibenzyl-hexahydro-1H-furo[3,4-d] imidazole-2,4,6-trione and, simultaneously, 110 g. of cyclohexanol are added portionwise over a period of 1½ hours to 1 l. of boiling benzene. The resulting mixture is boiled at reflux for an additional 16 hours and then evaporated in vacuum. Except for minor amounts of excess cyclohexanol and benzene, the residue is practically pure cis-1,3 - dibenzyl - 5 - cyclohexyloxycarbonyl - 2 - oxo - 4-imidazolidine-carboxylic acid, which can be crystallized by dissolving in 800 ml. of ether and adding 400 ml. of n-hexane, and has a melting point of 130°–131° C. The oily residue is dissolved in 1500 ml. of isopropanol at 75°–80° C. and mixed with a solution of 110 g. of (+)-ephedrine in 1500 ml. of isopropanol heated to 75° C. The mixture is allowed to cool to 35° C. within about 1½ hours and the crystals are removed by filtration. There are obtained 232 g. of ephedrine salt of (+)-cis-1,3-dibenzyl - 5 - cyclohexyloxycarbonyl - 2 - oxo - 4-imidazolidine-carboxylic acid with a decomposition point of 172°–175° C. $[\alpha]_D^{25}=+11°$; $[\alpha]_{365}^{25}=+33.3°$ (c.=1 in dimethylformamide).

12.05 g. of ephedrine salt of (+)-cis-1,3-dibenzyl-5-cyclohexyloxycarbonyl - 2 - oxo - 4 - imidazolidine-carboxylic acid are shaken with 40 ml. of benzene and 10 ml. of 3 N sulfuric acid. The benzene layer is washed twice with 10 ml. of water and thereupon evaporated in vacuum. 8.72 g. of (+)-cis-1,3-dibenzyl-5-cyclohexyloxycarbonyl-2-oxo - 4 - imidazolidine-carboxylic acid are obtained, which can be crystallized from ether-hexane, and has a melting point of 82°–84° C. $[\alpha]_D^{25}=+7.6°$; $[\alpha]_{365}^{25}=+29.1°$ (c.=1 in benzene).

8.77 g. of this acid are dissolved in 20 ml. of tetrahydrofuran and treated with 2.02 g. of triethylamine. This solution is added dropwise under an atmosphere of nitrogen to a boiling solution containing 1.2 g. of lithium borohydride in 40 ml. of tetrahydrofuran. The mixture is boiled at reflux for an additional 2 hours and then 30 ml. of 6 N hydrochloric acid are cautiously added. The reaction mixture is concentrated in vacuum and partitioned between water and benzene. The organic phases, washed neutral, are evaporated to dryness in vacuum and the residue rapidly dissolved in 25 ml. of ether. (+)-cis-1,3-dibenzyl-hexahydro-1H - furo[3,4-d]imidazole - 2,4-dione rapidly crystallizes, whereby 5.88 g. are obtained, with a melting point of 120–121° C. $[\alpha]_D^{25}+58.2°$;

$$[\alpha]_{365}=+212.8°$$

(c.=1 in benzene).

EXAMPLE 4

Preparation of the ephedrine salt of (+)-cis-1,3-dibenzyl-5-cyclohexyloxycarbonyl-2-oxo - 4 - imidazolidine - carboxylic acid At 75°–80° C., 87.2 g. of cis-1,3-dibenzyl-5-cyclohexyloxycarbonyl-2-oxo-4-imidazolidine - carboxylic acid prepared in accordance with Example 3, and 14 ml. of triethylamine are dissolved in 400 ml. of isopropanol on the one hand and 18.3 g. of (+)-ephedrine are dissolved in 400 ml. of isopropanol on the other hand and the two warm solutions are combined. The mixture is allowed to cool slowly to 30° to 25° C. and is filtered. There are obtained about 36.3 g. of crystals which are recrystallized from 250 ml. of ethanol to yield 27 g. of the ephedrine salt of (+)-cis-1,3-dibenzyl-5-cyclohexyloxycarbonyl - 2-oxo-4-imidazolidine-carboxylic acid with a decomposition point of 177°–178° C., $[\alpha]_D^{25}=+11.3°$; $[\alpha]_{365}^{25}=+32.3°$ (c.=1 in dimethylformamide).

EXAMPLE 5

Preparation of (+)-cis-1,3-dibenzyl-hexahydro-1H-furo[3,4-d]-imidazole-2,4-dione A solution of 2 g. of lithium borohydride in 50 ml. of tetrahydrofuran is heated to 65° C. and a solution of 12 g. of ephedrine salt of (+)-cis-1,3-dibenzyl-5-cyclohexyloxycarbonyl-2-oxo-4-imidazolidine-carboxylic acid (obtained in accordance with Example 3 or 4) in 250 ml. of tetrahydrofuran is added dropwise over a period of 30 minutes. After 1 hour, 150 ml. of tetrahydrofuran are removed by distillation and the mixture is boiled at reflux for an additional 20 hours. 50 ml. of 6 N hydrochloric acid are then cautiously added and the mixture is heated for an additional hour. The mixture is evaporated under vacuum and the residue is taken up in water and benzene. The benzene extract is washed neutral, dried and evaporated. The residue is crystallized from 50 ml. of ether whereby there are obtained 5.9 g. of (+)-cis-1,3-dibenzyl-hexahydro-1H-furo[3,4-d]imidazole-2,4-dione, having a melting point of 119–120° C. $[\alpha]_D^{22}=+57.9°$;

$$[\alpha]_{265}^{25}=+206°$$

(c.=1 in benzene).

EXAMPLE 6

Preparation of cis-1,3-dibenzyl-2-oxo-4,5-imidazolidine-dicarboxylic acid

The acetonic and ethanolic mother liquors from Example 1, paragraph 1, are evaporated to dryness. The combined residues are dissolved in 700 ml. of ethanol, treated with 140 ml. of 28% aqueous sodium hydroxide solution and maintained at room temperature for 15 hours. The alcohol is then evaporated in vacuum and the residue cooled to 20° C. The precipitated cholesterol is removed by filtration and washed with water and ethanol and dried. About 63.5 g. of cholesterol are obtained. The filtrate is concentrated to 150 ml. in vacuum and the solution poured into 200 ml. of concentrated hydrochloric acid. The precipitate is filtered, washed and there are recovered about 33 g. of cis-1,3-dibenzyl-2-oxo-4,5-imidazolidine - dicarboxylic acid.

EXAMPLE 7

Preparation of cis-1,3-dibenzyl-2-oxo-4,5-imidazolidine-dicarboxylic acid

The mother liquor from Example 3, paragraph 1, is evaporated to dryness in vacuum and the residue is partitioned between benzene and dilute sulfuric acid. The benzene phase is further washed with water. The aqueous solutions are combined, made strongly alkaline with sodium hydroxide and extracted with ether to recover the (+)-ephedrine. The benzene extracts are concentrated to about 550 ml. total volume and boiled at reflux with stirring for 2 hours with 300 ml. of 28% aqueous sodium hydroxide solution. After cooling the mixture, the phases are separated. The aqueous phase is made strongly acidic with dilute hydrochloric acid and extracted twice with ether. After evaporation of the solvent, there are obtained 202 g. of cis-1,3-dibenzyl-2-oxo-4,5-imidazolidine-dicarboxylic acid.

We claim:

1. (+)-Cis-1,3-dibenzyl - hexahydro - 1H - furo[3,4-d] imidazole-2,4-dione.

2. Diastereomeric cis-1,3-dibenzyl-5-(3'-cholesteryloxycarbonyl) - 2 - oxo-4-imidazolidine - carboxylic acids and their triethylamine salts.

3. In accordance with claim 2, diastereomeric cis-1,3-dibenzyl - 5 - (3' - cholesteryloxycarbonyl)-2-oxo-4-imidazolidine-carboxylic acids.

4. In accordance with claim 2, diastereomeric cis-1,3-dibenzyl - 5 - (3' - cholesteryloxycarbonyl)-2-oxo-4-imidazolidine-carboxylic acid salts of triethylamine.

5. Racemic cis-1,3-dibenzyl-5-cyclohexyloxycarbonyl-2-oxo-4-imidazolidine-carboxylic acid.

6. In accordance with claim 5, (+)-cis-1,3-dibenzyl-5-cyclohexyloxycarbonyl - 2 - oxo - 4 - imidazolidine-carboxylic acid.

7. In accordance with claim 5, (−)-cis-1,3-dibenzyl-5-cyclohexyloxycarbonyl-2-oxo-4-imidazolidine - carboxylic acid.

8. Diastereomeric cis-1,3-dibenzyl-5-cyclohexyloxycarbonyl-2-oxo-4-imidazolidine-carboxylic acid salts of (+)-ephedrine.

9. Process for preparing the optically active lactone of the formula

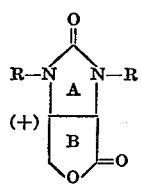

wherein the rings A and B are cis-linked and R is benzyl, which comprises treating a compound of the formula

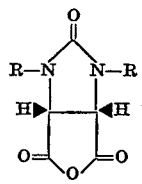

wherein R is as above, with cyclohexanol to yield the corresponding enantiomeric half-esters of the formulas

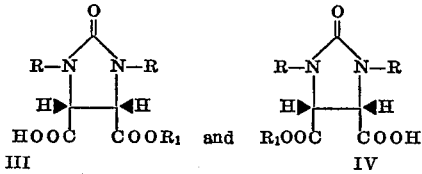

wherein $R_1$ is cyclohexyl, treating the enantiomeric cyclohexyl half-esters with ephedrine, separating the enantiomeric cyclohexyl half-esters by fractional crystallization of their ephedrine salts and treating the desired (+)-antipode with lithium borohydride to yield the (+)-lactone of Formula I.

10. Process according to claim 9, wherein the cyclohexyl half-esters are separated by fractional crystallization of their salts with (+)-ephedrine.

11. Process for preparing the optically active lactone of the formula

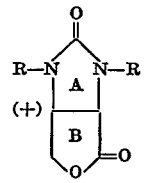

wherein the rings A and B are cis-linked and R is benzyl, which comprises treating a compound of the formula

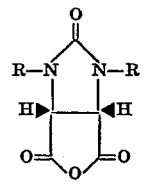

wherein R is as above, with cholesterol to yield the corresponding diastereomeric half-esters of the formulas

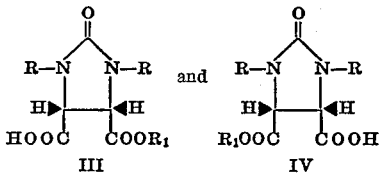

wherein $R_1$ is cholesteryl, treating the diastereomeric cholesterol half-esters with triethylamine, separating the diastereomeric cholesterol half-esters by fractional crystallization of their triethylamine salts and treating the desired (+)-diastereomer with lithium borohydride to yield the (+)-lactone of Formula I.

References Cited

UNITED STATES PATENTS

| | | | |
|---|---|---|---|
| 2,519,720 | 8/1950 | Surmatis et al. | 260—309 |
| 3,304,312 | 2/1967 | Beachem | 260—309.7 |

HENRY A. FRENCH, Primary Examiner

U.S. Cl. X.R.

260—309.7